(12) United States Patent
Backert

(10) Patent No.: US 8,411,475 B1
(45) Date of Patent: Apr. 2, 2013

(54) POWER SUPPLY CONVERTING AC TO DC AND USING CHANGING VOLTAGE OF AC TO FORCE DC INTO A LOAD

(76) Inventor: Robert H. Backert, Churchville, PA (US)

( * ) Notice: Subject to any disclaimer, the term of this patent is extended or adjusted under 35 U.S.C. 154(b) by 0 days.

(21) Appl. No.: 13/297,622

(22) Filed: Nov. 16, 2011

(51) Int. Cl.
  *H02M 3/18* (2006.01)
  *H02M 7/00* (2006.01)
(52) U.S. Cl. .......................... 363/60; 363/61
(58) Field of Classification Search ............... 363/59–61
  See application file for complete search history.

(56) References Cited

U.S. PATENT DOCUMENTS

| | | | | |
|---|---|---|---|---|
| 4,109,306 A | * | 8/1978 | Mason | 363/61 |
| 4,199,805 A | * | 4/1980 | Martinelli et al. | 363/60 |
| 4,437,147 A | * | 3/1984 | Takamura et al. | 363/61 |

OTHER PUBLICATIONS

J. J. Kisch et al., High Frequency Capacitor-Diode Voltage Multiplier Dc-DC COnverter Development progress Report, Hughes Aircraft Co,, Jul. 1977, 1-71.*

* cited by examiner

*Primary Examiner* — Jue Zhang
(74) *Attorney, Agent, or Firm* — Ryder, Lu, Mazzeo & Konieczny, LLC; Douglas J. Ryder

(57) ABSTRACT

A power supply to convert AC power to DC power with a relatively constant voltage and linear current delivery. The DC power may be positive or negative voltage, or both may be produced. A fluctuating voltage from an AC voltage source (e.g., a transformer) is utilized to charge and substantially discharge a storage device on a cycle by cycle basis. The voltage of the storage device continuously supplements the fluctuating voltage to result in relatively constant voltage. Unlike a typical power supply, (a) the discharge of the storage device forces power into a load, (b) total capacitance may be substantially less than (e.g., 1% or less of) the capacitance of a typical power supply, (c) a shunt capacitor is not required, and (d) the transformer may be continuously utilized throughout the entire cycle (rather than for only a brief portion of each cycle), which may reduce noise.

13 Claims, 15 Drawing Sheets

POWER SUPPLY CONVERTING AC TO DC AND USING CHANGING VOLTAGE OF AC TO FORCE DC INTO A LOAD

BACKGROUND

Power supplies (power converters) are often contained in electrical devices to convert alternating current (AC) power received from, for example, a conventional wall outlet to a desired direct current (DC) power for the device. The AC power has continuously varying voltage and the DC power provided to the device is typically at a constant voltage.

FIG. 1 illustrates a high level block diagram of an example power supply 100 typically used to convert AC power to DC power with a constant voltage. The power supply 100 includes a transformer 110, a rectifier (full-wave rectifier) 120, and a storage device (shunt capacitor) 130. The transformer 110 is to adjust (step up, step down) the input AC voltage to the desired voltage for a particular device. For example, the transformer 110 may step down 120 V received (e.g., from a wall outlet) to 60 V. It is possible that a device's voltage requirement could be the same as the incoming AC voltage in which case the transformer 110 could be eliminated.

The full wave rectifier 120 converts the AC voltage to a DC voltage by only providing the voltage above a certain reference voltage or ground (positive portion of the voltage). The DC voltage from the full wave rectifier 120 still varies from the reference voltage (e.g., 0 V) to a peak voltage (associated with the desired voltage of a device). The DC voltage is provided to and utilized to charge the shunt capacitor 130. The charged shunt capacitor 130 is to provide the required power (current needed at substantially constant desired voltage) to a load 140. In order to provide the required power to the load 140, the shunt capacitor 130 has to be capable of holding the majority of its charge for a relatively long period of time and thus has a relatively high capacitance value.

When the AC voltage provided to the full wave rectifier 120 from the transformer 110 is below the voltage stored in the shunt capacitor 130, the full wave rectifier 120 blocks current flow therethrough. As the voltage stored in the shunt capacitor 130 is drained by the load 140 and falls below the voltage provided by the full wave rectifier 120, the full wave rectifier 120 allows current to pass and thus recharge the shunt capacitor 130. The current provided by the transformer 110 (as controlled by the full wave rectifier 120) is only utilized for a relatively small portion of time to recharge the shunt capacitor 130.

FIG. 2A illustrates a circuit diagram of one common type of power supply 200. The power supply 200 includes the transformer 110, the full-wave rectifier 120, and the shunt capacitor 130. The transformer 110 includes a primary winding 212 and a secondary winding 214, where the adjustment to the incoming AC voltage is based on the ratio of primary windings 212 to secondary windings 214. The secondary windings 214 include an upper tap (T1) 216 and a lower tap (T2) 218. The voltage provided by the taps 216, 218 may be complimentary to each other with respect to a reference voltage (e.g., ground). That is, while T1 is providing a voltage above the reference voltage (positive voltage) T2 is providing a corresponding voltage below the reference voltage (negative voltage) and vice versa.

The full-wave rectifier 120 includes four (4) diodes 222, 224, 226, 228 arranged as a diode bridge. The diodes 222, 224 are connected between the taps 216, 218 and the positive terminal of the capacitor 130. The anodes (positive side) of the diodes 222, 224 are connected to the taps 216, 218 and the cathodes (negative side) are connected to the capacitor 130. The diodes 226, 228 are connected between the taps 216, 218 and the negative terminal of the capacitor 130 (as well as a common point 250 having a reference voltage (e.g., ground) and the common/negative terminal of the load 140). For ease of explanation we will simply refer to the common point 250 having a reference voltage as ground (e.g., 0V). The cathodes of the diodes 222, 224 are connected to the taps 216, 218 and the anodes are connected to the capacitor 130 and ground 250. The diodes 222, 224, 226, 228 allow current to flow in only one direction.

Accordingly, the full wave rectifier 130 provides only the portion of the voltage above ground (positive voltage) from each tap 216, 218 as one output and ground (0V) as the other output. The output of the full-wave rectifier 120 is utilized to charge the shunt capacitor 130. As noted above the charge stored in the shunt capacitor 130 may result in the full-wave rectifier 120 only utilizing current from the transformer 110 a small portion of the time.

The voltage provided by the shunt capacitor 130 may have ripples (vary above and below the desired voltage). Accordingly, the power supply 200 may include a voltage regulator 260 to smooth out the ripples. Alternatively, the voltage regulator may be utilized external to the power supply 200.

FIG. 2B illustrates a circuit diagram of one common type of power supply 205. The transformer 110 includes an additional center tap 219. The center tap 219 will be the cross over point between the upper and lower taps 216, 218, the reference voltage (e.g., 0V) by which the voltages provided by the taps 216, 218 are measured. The center tap 219 is connected to the negative terminal of the capacitor 130 (as well as the common/negative terminal of the load 140 and possibly ground 250). Accordingly, the full-wave rectifier 120 only needs two (2) diodes 222, 224. The diodes 222, 224 are connected between the taps 216, 218 and the positive terminal of the capacitor 130. The anodes of the diodes 222, 224 are connected to the taps 216, 218 and the cathodes are connected to the capacitor 130.

FIG. 3 illustrates an example timing diagram for the operation of a typical power supply (e.g., 100, 200, 205). Diagram (a) illustrates an example output of the transformer 110. When tap T1 216 is providing a voltage above a reference voltage that is provided by the center tap 219 or connectivity to a common point 250 (positive voltage), tap T2 218 is providing a voltage below the reference voltage (negative voltage) and vice versa. It should be noted that the reference voltage is illustrated as 0V (e.g., ground). Diagram (b) illustrates an example output of the full-wave rectifier 120 assuming there is no voltage stored in the shunt capacitor 130. When tap T1 216 is providing a positive voltage the full-wave rectifier 120 provides that voltage as an output and when tap T2 218 is providing a positive voltage the full-wave rectifier 130 provides that voltage as an output.

Diagram (c) illustrates an example charge status of the shunt capacitor 130. From time t0 to time t1, the shunt capacitor 130 is charged by the tap T1 216. After the shunt capacitor 130 is charged it provides the required power (current needed at substantially constant voltage) to the load 140. As the shunt capacitor 130 provides the power it begins to discharge (as illustrated the shunt capacitor 130 is slowly discharging from time t1 to between time t2 and t3). Once the charge in the capacitor 130 falls below the charge from a particular tap of the transformer 110, the full-wave rectifier 120 allows the current to pass and thus recharge the capacitor 130 (as illustrated the shunt capacitor 130 is being recharged from a point between time t2 and t3 until time t3).

Diagram (d) illustrates an example output of the full-wave rectifier 120 during operation. Between time t0 and t1, the full-wave rectifier 120 allows the transformer 110 (T1 216) to charge the capacitor 130. After the capacitor 130 is charged the full-wave rectifier 120 blocks the current from the transformer 110 until the voltage from the transformer 110 is above the charge stored in the capacitor 130. As illustrated, for a portion of time between time t2 and t3, T2 218 provides the voltage and for a portion of time between t4 and t5, T1 216 provides the voltage.

There are several disadvantages to the common power supply (e.g., 100, 200, 205) that utilizes a shunt capacitor 130 to provide power (current required at substantially constant voltage) to the load 140. The shunt capacitor 130 cannot deliver the required current exactly as needed by the load (e.g., an electrical device) and does not respond to changes in the current required by the load in a timely fashion. Rather, the current delivery from such capacitors is inaccurate ("non-linear"), in that sometimes less current than necessary is delivered and other times more current than necessary is delivered, and in that the shunt capacitor is relatively slow to respond to changes in the current required by the load. Therefore, in devices that benefit from a very linear, accurate delivery of current, the use of the usual power supply impairs performance.

Also, typical power supplies require very large capacitance values in the shunt capacitor. This generally forces manufacturers to use electrolytic capacitors, which are noticeably less linear than other types of capacitors. An electrolytic capacitor in a power supply can sometimes be replaced by several smaller-value non-electrolytic capacitors, but this typically greatly increases cost, size and weight.

Attempts have been made to increase the linear current delivery of current power supplies by utilizing higher quality shunt capacitors and/or by utilizing additional shunt capacitors. These attempts can increase the cost of an electrical device and do not fully eliminate the problem.

Another drawback of the typical power supply is that, as a shunt capacitor 130 releases current into an electrical device, the capacitor's power is constantly depleted. Therefore, it periodically requires a "top-up" of power (current) from the AC source. The amount of power (current) from the transformer 110 which is necessary to top-off a shunt capacitor may be greater than, possibly many times greater than, the power (current) required to operate the device (load). The full-wave rectifier 120 may create electronic "noise" in the system as this burst of power (current) from the transformer begins, and when the burst ends. This electronic "noise" can decrease the performance of the electrical device (load).

BRIEF DESCRIPTION OF THE DRAWINGS

The features and advantages of the various embodiments will become apparent from the following detailed description in which.

DETAILED DESCRIPTION

Figure 4:
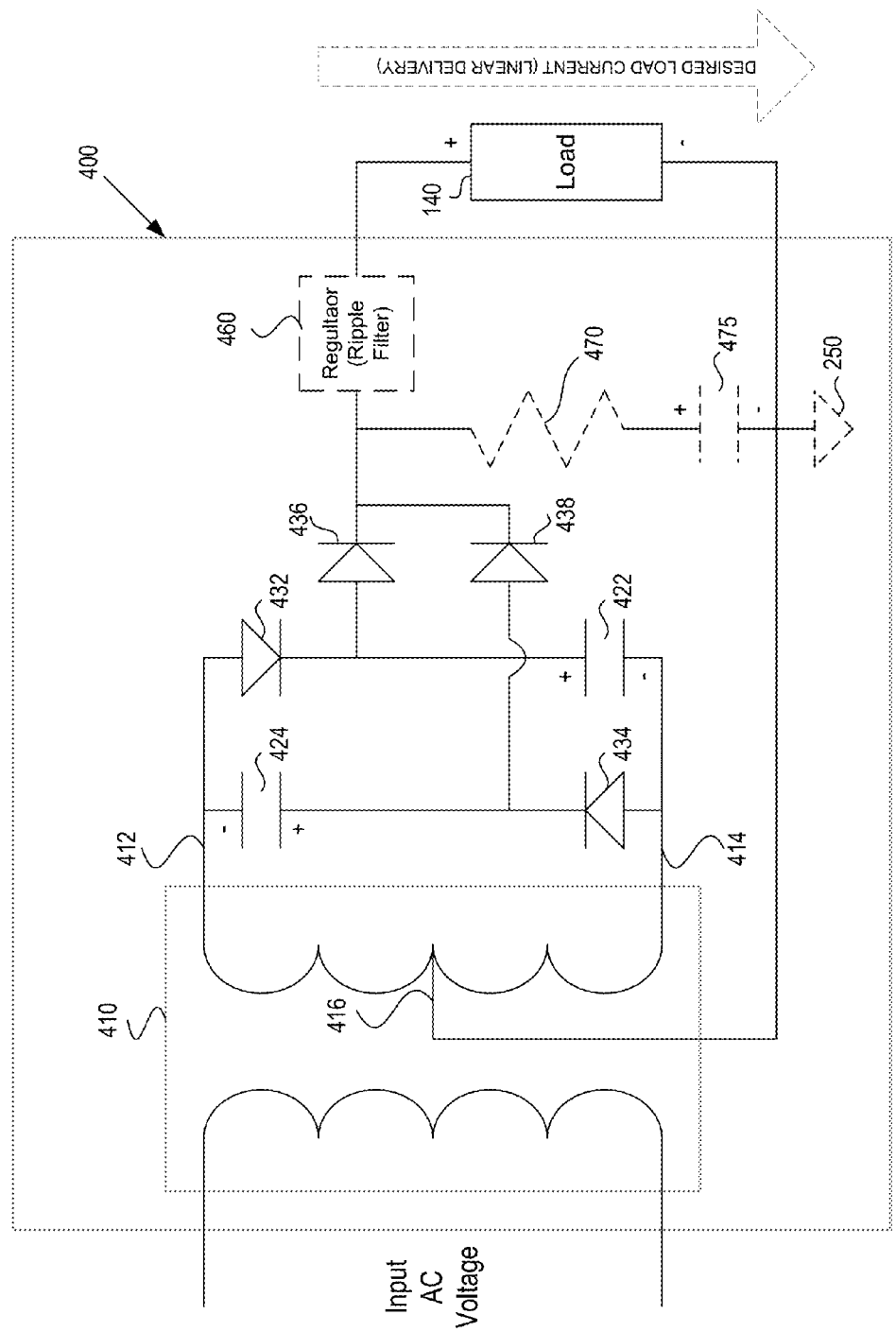
FIG. 4 illustrates an example power supply to convert AC power into usable, relatively constant-voltage DC power without using a shunt storage capacitor, according to one embodiment.

FIG. 4 illustrates an example power supply 400 to convert AC power into DC power at a relatively constant voltage desired by a load 140 and to provide linear delivery of current to the load 140. The power supply 400 does not include a shunt storage capacitor. The power supply 400 includes a center tap transformer 410, two devices to store voltage (e.g., storage devices, capacitors) 422, 424, and four devices to permit current to flow in only one direction (e.g., rectifiers, diodes, transistors) 432, 434, 436, 438. For purposes of discussion, it will be assumed that the devices to store voltage are capacitors and that the devices to permit current to flow in only one direction are diodes. The center tap transformer 410 is to convert the AC voltage (such as from a conventional wall outlet) to a voltage desired by the load 140. The capacitors 422, 424, and the diodes 432, 434, 436, 438 are to convert the AC voltage to a DC voltage and provide power (current required at relatively constant desired voltage) to the load 140 in a linear fashion.

An upper tap (T1) 412 is connected to a positive side of a first capacitor 422 via a first diode 432 and a lower tap (T2) 414 is connected to a positive side of a second capacitor 424 via a second diode 434. The anodes of the diodes 432, 434 are connected to the taps 412, 414 respectively and the cathodes are connected to the capacitors 422, 424 respectively. The negative side of the first capacitor 422 is connected to T2 414 and the negative side of the second capacitor 424 is connected to T1 412. A center tap (CT) 416 provides a reference voltage between T1 412 and T2 414. Connecting the capacitors 422, 424 to both taps 412, 414 enables the capacitors 422, 424 to be charged to twice the desired voltage of the load 140 as the terminals receive the respective voltage above (positive voltage) and below (negative voltage) the reference voltage associated with the CT 416.

The diodes 432, 434 (full-wave rectifier) limit the application of the AC voltage (current flow) from T1, T2 412, 414 to the positive terminals of the respective capacitors 422, 424 to periods of time when the voltage provided by T1, T2 412, 414 is greater than the voltage on the positive terminals of the respective capacitors 422, 424. Connecting the negative terminals of the capacitors 424, 422 directly to T1, T2 412, 414 respectively, enables the transformer 410 to charge and discharge the capacitors 424, 422.

The positive terminal of the first capacitor 422 (and the cathode of the first diode 432) are also connected to anode of a third diode 436. The positive terminal of the second capacitor 424 (and the cathode of the second diode 434) are also connected to anode of a fourth diode 438. The cathode of the third and fourth diodes 436, 438 are connected together and to the positive terminal of the load 140. The diodes 436, 438 isolate the capacitors 422, 424 from one another, thereby avoiding a short circuit. That is, the diodes 436, 438 allow the output of the capacitors 422, 424 to be combined without combining differing time cycles of the capacitors 422, 424.

The CT 416 of the transformer 410 is connected to the negative (common) terminal of the load 140. The CT 416 and the common terminal of the load 140 may be tied to ground 250.

Figure 5A:
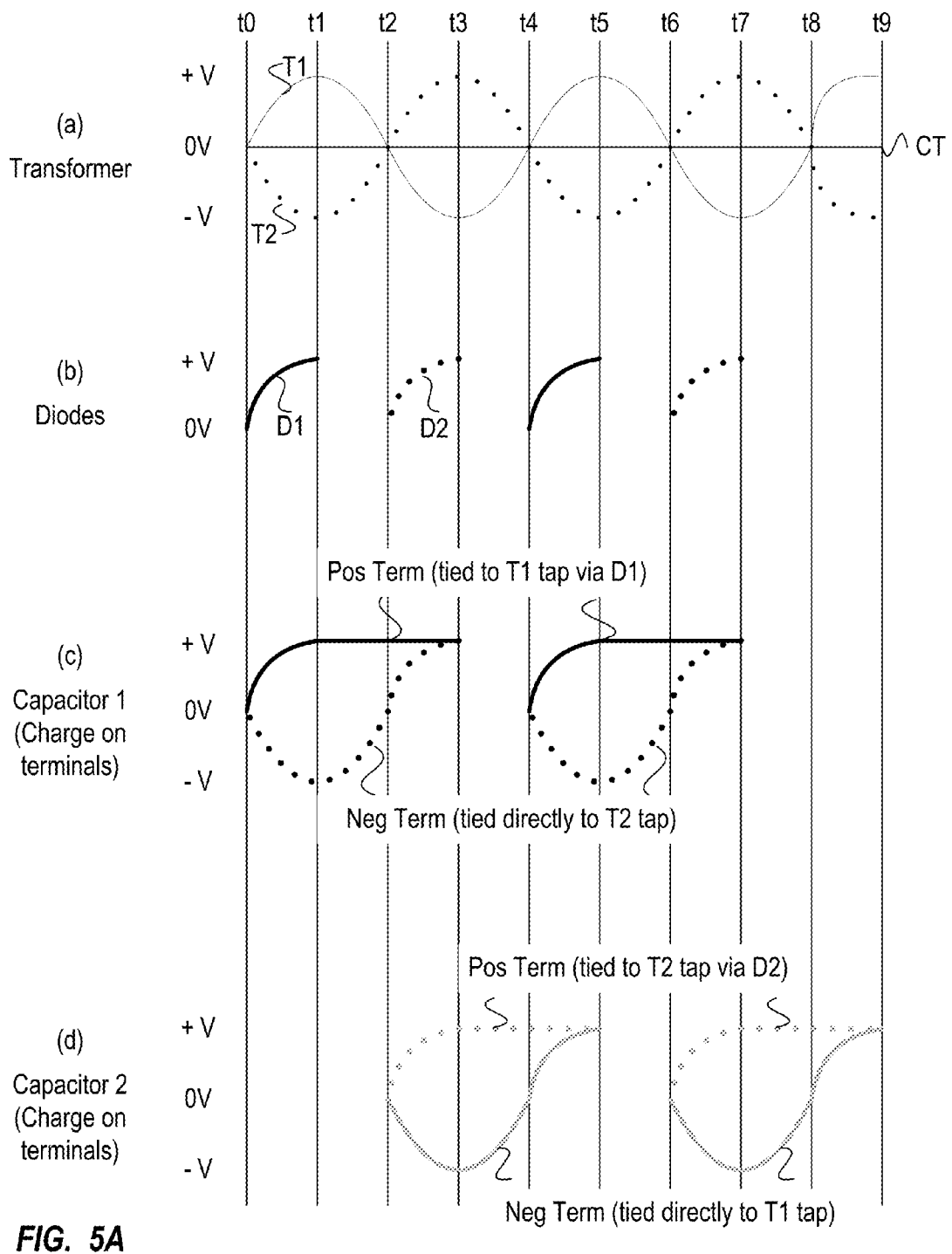
FIGS. 5A-B illustrate example timing diagrams associated with the operation of the power supply of FIG. 4, according to one embodiment.
Figure 5B:
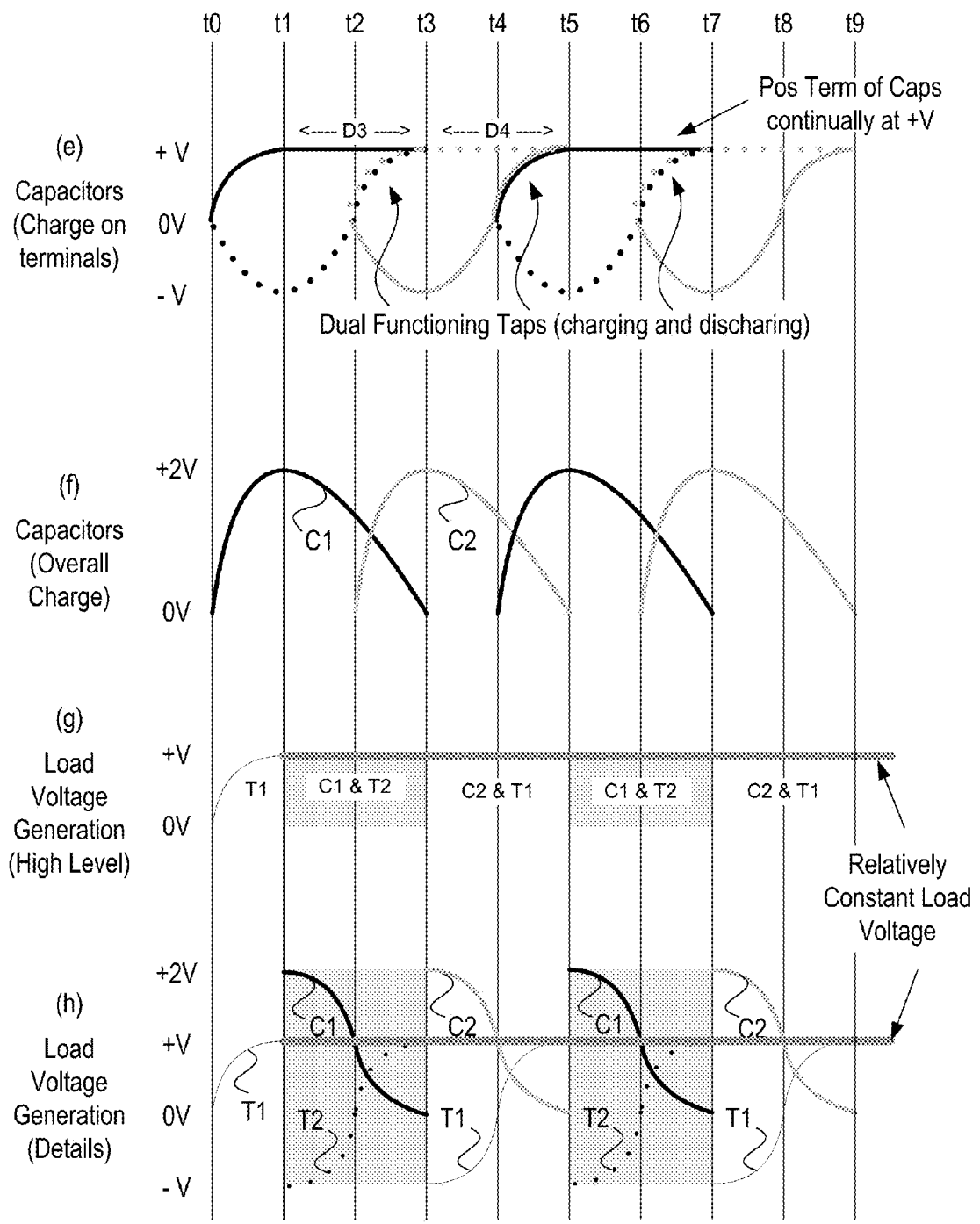

FIGS. 5A-B illustrate example timing diagrams associated with the operation of the power supply 400. Diagram (a) illustrates an example output of the transformer 410. When tap T1 412 is providing a voltage above the reference voltage of the CT 416 (positive voltage), tap T2 414 is providing a voltage below the CT 416 (negative voltage) and vice versa. The CT 416 reference voltage is a constant voltage (0 V as illustrated). The power supply 400 is intended to provide the desired voltage (+V as illustrated) to the load 140.

Diagram (b) illustrates an example output of the first and second diodes 432, 434. The first diode 432 enables T1 412 to charge the first capacitor 422 to the desired voltage (+V) from t0 to t1. From t1 to t4 as the voltage provided by T1 412 changes from +V to 0V to −V and then back to 0V, the first diode 432 blocks the AC voltage (current flow) from T1 412 as the voltage provided by T1 412 is less than the charge on the first capacitor 422. The process starts again at t4 when T1 412 crosses over the CT 416 and provides a positive voltage at which point the first capacitor 422 is no longer charged (discussed in more detail with regard to diagrams c and f).

The second diode 434 enables T2 414 to charge the second capacitor 424 once T2 crosses over the CT 416 and provides a positive voltage (from t2 to t3). From t3 to t6 the voltage provided by T2 414 is less than the charge on the second capacitor 424 and the second diode 434 blocks the AC voltage (current flow) from T2 414. The process starts again at t6 once T2 414 provides a positive voltage at which point the second capacitor 424 is no longer charged.

Diagram (c) illustrates an example of the charge provided on the terminals of the first capacitor 422. From time t0 to t1, the positive terminal is charged by T1 412 to the desired voltage (+V) while the negative terminal is charged by T2 414 to the complimentary voltage (−V). At time t1, the charge stored in the first capacitor 422 is twice the desired voltage (+2V), which is the difference in the voltage applied to the terminals (+V to −V). From t1 to t3, the first diode 432 blocks the AC voltage from T1 412 as the charge on the positive terminal (+V) is greater than the voltage provided by T1 412. Accordingly, the +V charge on the positive terminal of the first capacitor 422 is maintained. From t1 to t3, the charge on the negative terminal of the first capacitor 422 is changed along with T2 414 as the negative terminal is directly connected to T2 414. As illustrated, at t2 the charge is 0V and at t3 it is +V.

The first capacitor 422 is discharged as the charge applied to the negative terminal of the capacitor 422 by T2 414 is changed (discussed in more detail with respect to diagram f). In effect, keeping the charge on the positive terminal of the capacitor 422 constant while the charge on the negative terminal changes along with T2 414 is forcing charge out of the first capacitor 422 into the load 140. The process starts over again at t4 when the voltages provided by T1 412 and T2 414 cross each other and the center tap 416 (ground).

Diagram (d) illustrates an example of the charge provided on the terminals of the second capacitor 424. From time t2 to t3, the positive terminal is charged by T2 414 to +V while the negative terminal is charged by T1 412 to −V. At time t3, the charge stored in the second capacitor 424 is twice the desired voltage (+2V). From t3 to t5, the second diode 434 blocks the AC voltage from T2 414 as the charge on the positive terminal (+V) is greater than the voltage provided by T2 414. From t3 to t5, T1 412 changes the charge applied to the negative terminal as the negative terminal is directly connected to T1 412 (as illustrated 0V at t4 and +V at t5). The second capacitor 424 is forced to discharge as the charge applied to the negative terminal of the second capacitor 424 by T1 412 is changed. The process starts over again at t6.

Diagram (e) illustrates an example overlap of the charges provided to the capacitors 422, 424. From t1 forward the positive terminal of one of the capacitors 422, 424 is always charged to the desired voltage (+V). Between t1 and t3 the desired voltage is provided through the third diode 436, between t3 and t5 the desired voltage is provided through the fourth diode 438, and so on. Between t2 and t3, T2 414 is being utilized to both force charge from the first capacitor 422 as well as charge the second capacitor 424. Likewise, between t4 and t5, T1 412 is being utilized to both force charge from the second capacitor 424 as well as charge the first capacitor 422. The capacitors 422, 424 do not contribute to the load power while they are being charged.

Diagram (f) illustrates an example of the overall charge of the capacitors 422, 424. From t0 to t1, the first capacitor 422 is charged by the taps 412, 414. At t1, the charge in first capacitor 422 is twice the desired voltage (+2V) as the charge provided to positive terminal by T1 412 is +V and the charge provided to the negative terminal by T2 414 is −V. From t1 to t2, the first capacitor 422 discharges as the charge provided to the negative terminal by T2 414 changes from −V to 0V. At t2, the charge in the first capacitor 422 is approximately the desired voltage (+V) as the charge provided to positive terminal by T1 412 is still +V and the charge provided to the negative terminal by T2 414 is 0V. From t2 to t3, the first capacitor 422 continues to discharge as the charge provided to the negative terminal by T2 414 changes from 0V to +V. At t3, the first capacitor 422 is substantially discharged as the charge provided to the positive terminal by T1 412 and the charge provided to the negative terminal by T2 414 are both +V (there is no voltage drop across the first capacitor 422). As noted above, the changing voltage of T2 414 in effect forces the charge out of the first capacitor 422 into the load 140. The process begins again at time t4 for the first capacitor 422.

The second capacitor 424 is charged up to twice the desired voltage from t2 to t3. From t3 to t5, the second capacitor 424 is discharged (at t4 the second capacitor 424 is charged to approximately +V and at t5 it is substantially discharged). The process begins again at time t6 for the second capacitor 424. When the second capacitor 424 is charged to +2V, the first capacitor 422 will be substantially discharged (e.g., at t3) and vice-versa.

Diagram (g) illustrates an example high level view of how the desired power (current required by load) is provided to the load at a relatively constant voltage (+V). From t0 to t1 the voltage is ramping up and is being provided by T1 412. From t1 to t3 the voltage is provided by the first capacitor 422 and T2 414. From t3 to t5 the voltage is provided by the second capacitor 424 and T1 412. The process continues on in this fashion.

Diagram (h) illustrates an example detailed view of how the desired power (current) is provided to the load at a relatively constant voltage (+V). At t1, the first capacitor 422 is charged to twice the desired voltage (+2V) and T2 414 is providing the compliment of the desired voltage (−V). The combination of the two provides approximately the desired voltage (+V). As the relative voltage provided by T2 414 goes from −V toward +V, the charge in the first capacitor 422 is reduced and the combination of the reduced charge from the first capacitor 422 and the increased charge from T2 414 provide approximately the desired voltage between t1 and t3.

By way of an example assume the desired voltage is 100V (voltage drop from center tap is 100V). At a point between t1 and t2, the voltage provided by T2 414 may have changed from −100V to −50V (changed from 100V below center tap to 50V below center tap). At such time, the first capacitor 422 has been discharged to approximately 150V (difference between 100V on positive terminal and −50V on negative terminal). The combination of the approximately 150V from the first capacitor 422 and the −50 V from T2 414 provides approximately the desired 100V. At t2, the voltage provided by T2 414 may have changed to 0V (is equal to center tap) at which point the first capacitor 422 has been discharged to approximately 100V (difference between 100V on positive terminal and 0V on negative terminal) so that the first capacitor 422 (of the combination first capacitor 422/T2 414) provides approximately the desired 100V.

At a point between t2 and t3, the voltage provided by T2 414 may have changed to +50V at which point the first capacitor 422 has been discharged to approximately 50V (difference between 100V on positive terminal and 50V on negative terminal). The combination of the approximately 50V from the first capacitor 422 and the 50 V from T2 414 provides approximately the desired 100V. At t3, the voltage provided by T2 414 may have changed to 100V. At such time, the first capacitor 422 has been substantially discharged (there is no difference between the 100V applied to each terminal) so that T2 414 (of the combination) provides approximately the desired 100V.

The combination of the second capacitor 424 and T1 412 provide the desired power to the load at a relatively constant voltage in a similar fashion between time t3 to t5. The process continues on in this fashion.

The power supply 400 utilizes the transformer 410 and the capacitors 422, 424 to provide the relatively constant voltage to the load 140 as well as the required current which may fluctuate depending on the operational requirements of the load 140. The transformer 410 is contributing (providing current) to the load 140 all of the time, rather than for a small percentage of the time to recharge the shunt capacitor as in the typical power supply.

For example, T1 412 charges C1 422 from t0 to t1, charges C2 424 from t2 to t3, forces charge out of C2 424 from t3 to t4 and then starts over again. It should be noted that between t0 and t1 the process has just started so there is no charge in C2 424 for T1 412 to force out. However, after the first cycle (t0 to t4), the initial quarter cycle of each cycle (e.g., t4 to t5) will also result in T1 412 forcing charge out of C2 424. T2 414 charges C1 422 from t0 to t1, forces charge out of C1 422 from t1 to t2, forces charge out of C1 422 and charges C2 424 from t2 to t3 and then starts over again at t4.

The transformer 410 is generally believed to provide a linear delivery of current. The capacitors 422, 424 are being discharged by the transformer 410 into the load 140 rather then being drained of their energy by the load as happens with a shunt storage capacitor. Accordingly, the power supply 400 provides more linear delivery of current than a conventional power supply.

As the capacitors 422, 424 are only charged for 75% of a cycle (e.g., the first capacitor 422 is charged to some extent from t0 to t3 and is substantially discharged from t3 to t4) and do not maintain a charge therewithin (hold charge for less than one AC power cycle) these capacitors 422, 424 can be a much smaller value than a shunt capacitor utilized in a typical power supply (e.g., approximately $1/100^{th}$ the value) depending on different parameters. Smaller value capacitors are inherently better able to provide more linear delivery of current.

The value of the capacitors 422, 424 is selected so as to be able to provide the desired voltage based on a peak current of the load 140 for an AC power cycle. That is, if the peak current was utilized by the load 140 for the entire cycle then the capacitor would be fully discharged at the end of the cycle. If the peak load was not required then the capacitor may not be fully discharged at the end of the cycle. The capacitors 422, 424 may need to be non-electrolytic capacitors as they will be charged and discharged on a cycle by cycle basis for the incoming AC power (60 Hz).

The value of the capacitors is based on the formula $1/(2\pi F R_L)$, where F is the frequency (e.g., 60 Hz) and $R_L$ is the resistance of the load (where $R_L$=V/I, where V is constant voltage driving the load, and I is maximum current on the load). By way of example, if the power supply 400 was utilized in a typical solid state audio preamplifier that operated at 50V and 50 mA the capacitors 422, 424 may each have a value of approximately 3 μF, while a typical power supply for such a preamplifier may have total capacitance on the order of 2,200 μF. If the power supply 400 was utilized in a typical tubed audio preamplifier that operated at 300V and 50 mA the capacitors 422, 424 may each have a value of approximately 0.5 μF, while a typical power supply for such a preamplifier may have total capacitance on the order of 100 μF.

While the transformer 410 is contributing all the time, the amount of power it is contributing is constant and may be only a fraction of the amount of power that is required to top-off a shunt storage capacitor in the typical power supply. That is, the transformer 410 will not need to provide the large bursts of power necessary to top-off a shunt storage capacitor as is required in a typical power supply. Accordingly, the power supply 400 will create far less electrical noise which will improve performance of the load 140.

By omitting the large value shunt storage capacitor, and thereby eliminating its irregularities in the delivery of current, the power supply 400 allows far more linear delivery of current to the load 140. The delivery of current to the load 140 is extremely accurate and can vary extremely quickly, as the power requirements of the load 140 vary. The increased linearity of the current that is fed to the load 140 thereby increases the performance of any load 140 that is able to benefit therefrom. Examples of devices that can benefit from more accurate/linear delivery of current include, but are not limited to, any machine that reproduces sound, such as an audio amplifier.

Diagrams (g) and (h) illustrate the load voltage produced to be relatively constant. However, the voltage produced will have ripples (fluctuations up and down) even if the current demands of the load 140 are relatively constant. For example, the voltage may have ripples based on the fact that the charge provided from the capacitors varies based on the voltage change per time (slope) of the voltage provided to the negative terminal thereof by the associated tap of the transformer 410. As illustrated, in diagram (a) the slope of the voltage provided by the taps is smaller as it approaches or leaves the desired voltage (peaks) than in the middle. The more the current demands of the load fluctuate the more ripple will be introduced.

Referring back to FIG. 4, a voltage regulator 460 is utilized to smooth the voltage provided to the load 140. The power supply 400 may include the voltage regulator 460. According to one embodiment, the voltage regulator 460 may be separate from the power supply 400 and be configured between the power supply 400 and the load 140. The power supply 400 may include a resistor 470 and a capacitor 475 to act as a filter to reduce ripple. The resistor 470 and the capacitor 475 may be utilized in place of, or in conjunction with, the voltage regulator 460.

The power supply 400 provided a positive voltage to the load 140. The invention is in no way limited thereto. Rather, a power supply within the scope of the current invention could provide a negative voltage to the load 140 or could provide a negative and positive voltage to the load without departing from the current scope.

Figure 6:
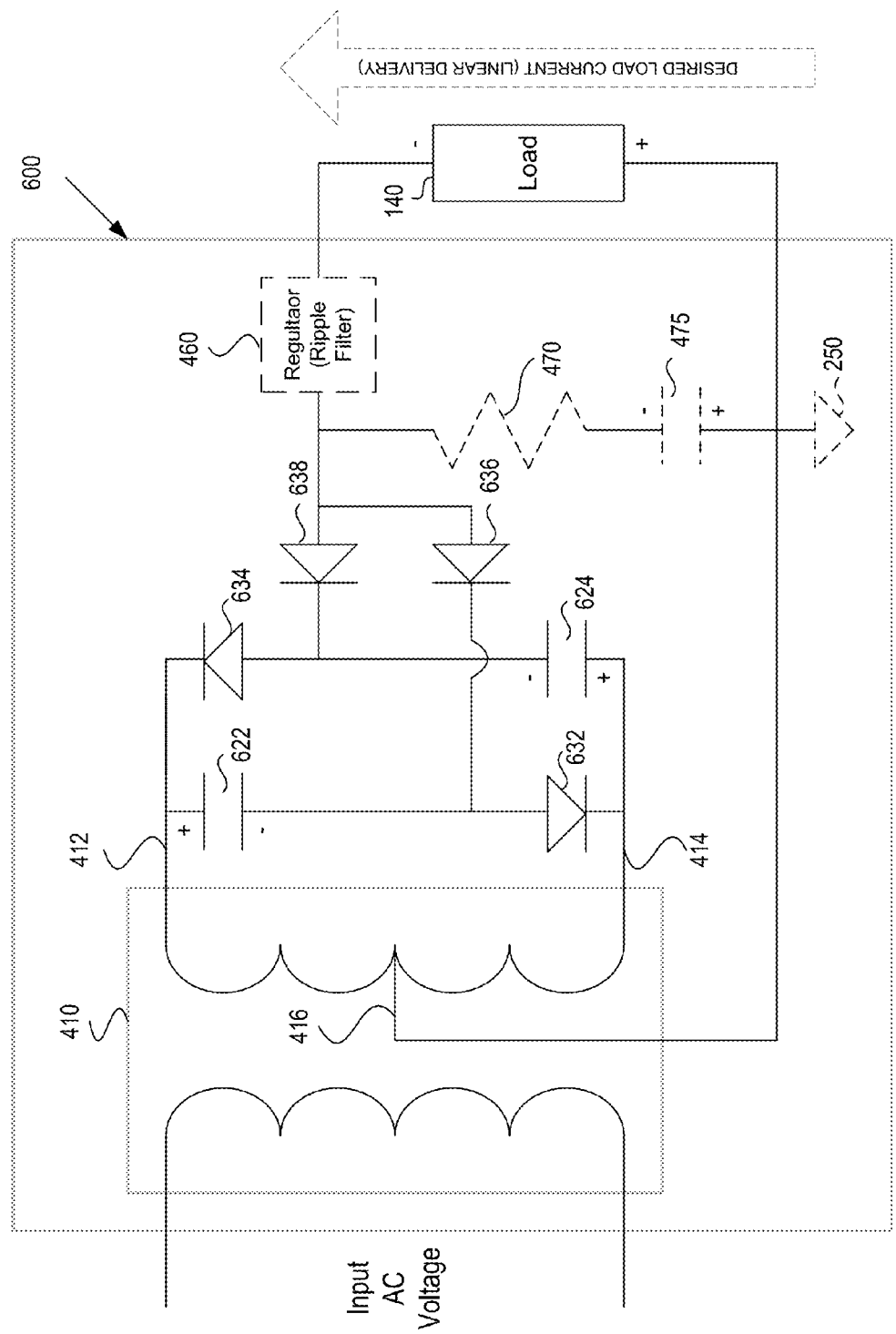
FIG. 6 illustrates an example negative voltage power supply, according to one embodiment.

FIG. 6 illustrates an example negative voltage power supply 600. The upper tap (T1) 412 is connected to a positive side of a first capacitor 622 and the lower tap (T2) 414 is connected to a positive side of a second capacitor 624. The negative side of the first capacitor 622 is connected to T2 414 via a first diode 632 and the negative side of the second capacitor 624 is connected to T1 412 via a second diode 634. The anodes of the diodes 632, 634 are connected to the capacitors 622, 624 respectively and the cathodes are connected to the taps 414, 412 respectively. The diodes 632, 634 (full-wave rectifier) limit the application of the AC voltage from T1, T2 412, 414 to the negative terminals of the respective capacitors 624, 622 to periods of time when the voltage provided by T1, T2 412, 414 provides a voltage drop (absolute voltage difference from CT 416) that is less than the voltage drop across the capacitors 624, 622. Connecting the positive terminals of the capacitors 622, 624 directly to T1, T2 412, 414 respectively enables the transformer 410 to charge and discharge the capacitors 622, 624.

The negative terminal of the first capacitor 622 (and the anode of the first diode 632) are also connected to cathode of a third diode 636. The negative terminal of the second capacitor 624 (and the anode of the second diode 634) are also connected to cathode of a fourth diode 638. The negative terminals of the capacitors 622, 624 have a negative voltage applied thereto (with respect to the center tap). The anode of the third and fourth diodes 636, 638 are connected together and to the negative terminal of the load 140. The CT 416 is connected to the positive (common) terminal of the load 140. The CT 416 and the common terminal of the load 140 may be tied to ground 250.

Figure 7A:
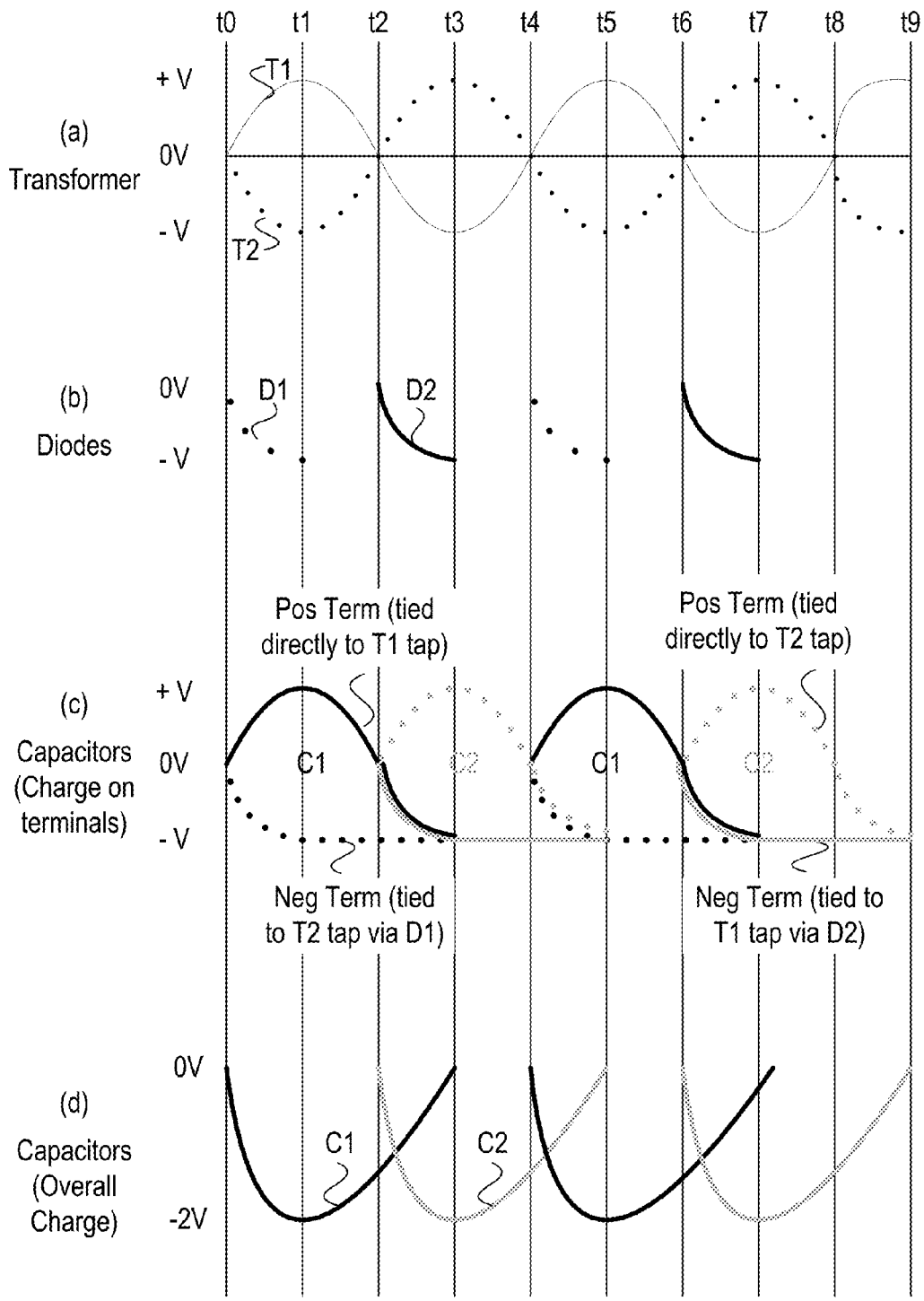
FIGS. 7A-B illustrate example timing diagrams associated with the operation of the power supply of FIG. 6, according to one embodiment.
Figure 7B:
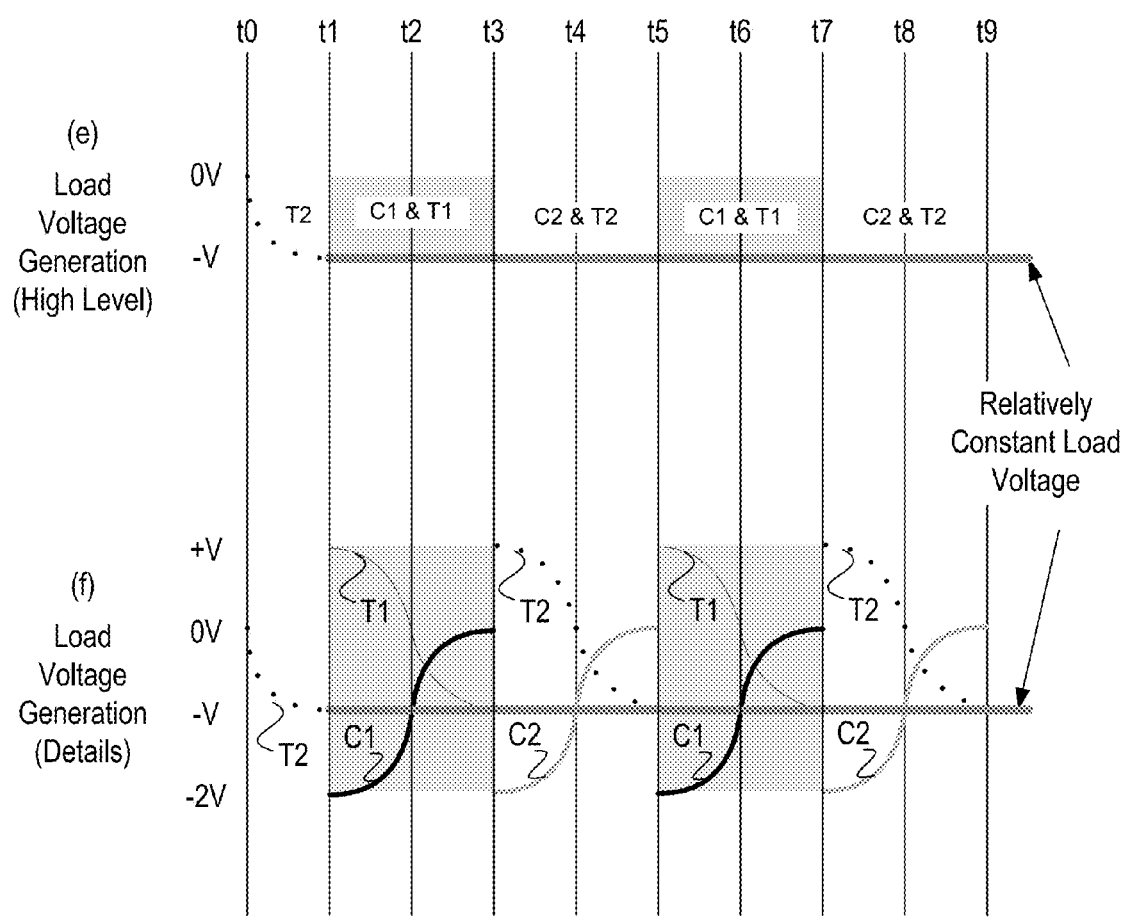

FIGS. 7A-B illustrate example timing diagrams associated with the operation of the power supply 600. The power supply 600 is intended to provide the desired voltage (−V as illustrated) to the load 140. Diagram (a) illustrates an example output of the transformer 610.

Diagram (b) illustrates an example output of the first and second diodes 632, 634. The first diode 632 enables T2 414 to charge the first capacitor 622 from t0 to t1. From t1 to t4, the first diode 632 blocks the AC voltage from T2 414 as the voltage provided by T2 414 results in a voltage drop that is less than the charge in (the voltage drop across) the first capacitor 622. The process starts again at t4 once T2 414 provides a negative voltage. The second diode 634 enables T1 412 to charge the second capacitor 624 from t2 to t3 when T2 becomes a negative voltage. From t3 to t6 the voltage provided by T1 412 results in a voltage drop that is less than the charge in the second capacitor 624. Therefore, the second diode 634 blocks the AC voltage from T1 412. The process starts again at t6 once T1 412 provides a negative voltage.

Diagram (c) illustrates the charges provided to the terminals of the capacitors 622, 624. From t1 forward the negative terminal of one of the capacitors 622, 624 is always charged to the desired voltage (−V). The first capacitor 622 is charged to −V from t1 to t3, the second capacitor 624 is charged to −V from t3 to t5, and so on.

For the first capacitor 622, from time t0 to t1, the positive terminal is charged by T1 412 to the complimentary voltage (+V) while the negative terminal is charged by T2 414 to the desired voltage (−V). At time t1, the overall charge in the first capacitor 622 is twice the desired voltage (−2V). From t1 to t3, the first diode 632 blocks the AC voltage from T2 414 to the first capacitor 622 so the −V charge on the negative terminal of the first capacitor 622 is maintained. From t1 to t3, T1 412 changes the charge on the positive terminal of the first capacitor 422 from +V to 0V (at t2) and then to −V (at t3) as the positive terminal is directly connected to T1 412. The first capacitor 622 is discharged as the charge applied to the positive terminal of the capacitor 622 by T1 412 is changed. The process starts over again at t4.

For the second capacitor 624, from time t2 to t3, the positive terminal is charged by T2 414 to +V while the negative terminal is charged by T1 412 to −V. At time t3, the overall charge in the second capacitor 624 is −2V. From t3 to t5, the second diode 634 blocks AC voltage from T1 412 to the second capacitor 624 so the −V charge on the negative terminal is maintained. From t3 to t5, T2 414 changes the charge on the positive terminal of the second capacitor 424 as the positive terminal is directly connected thereto. The second capacitor 624 is discharged as the charge applied to the positive terminal of the capacitor 624 by T1 412 is changed. The process starts over again at t6.

Between t1 and t3 the desired voltage is provided through the third diode 636, between t3 and t5 the desired voltage is provided through the fourth diode 638, and so on. Between t2 and t3, T1 412 is being utilized to both force power from the first capacitor 622 as well as charge the second capacitor 624. Likewise, between t4 and t5, T2 414 is being utilized to both force power from the second capacitor 624 as well as charge the first capacitor 622.

Diagram (d) illustrates an example of the overall charge in the capacitors 622, 624. The first capacitor 622 (as measured from the negative terminal) is charged to twice the desired voltage (−2V) at t1 as the charge provided to negative terminal by T2 414 is −V and the charge provided to the positive terminal by T1 412 is +V. From t1 to t2, the first capacitor 622 discharges from −2V to approximately −V as the charge provided to the positive terminal of the first capacitor 622 by T1 412 is reduced from +V to 0V. From t2 to t3, the first capacitor 622 continues to discharge until it is substantially discharged as the charge provided to the positive terminal of the first capacitor 622 by T1 412 is changed from 0V to −V. The process begins again at time t4 for the first capacitor 622.

The second capacitor 624 is charged to twice the desired voltage (−2V) from t2 to t3. From t3 to t5, as the charge provided to the positive terminal of the second capacitor 624 by T2 414 is changed from +V to 0V (at t4) to −V (at t5) the second capacitor 624 is discharged to approximately −V (at t4) and continues to discharge until it is substantially discharged (at t5). The process begins again at time t6 for the second capacitor 624. When the second capacitor 624 is charged to −2V, the first capacitor 622 will be substantially discharged (e.g., at t3) and vice-versa.

Diagram (e) illustrates an example high level view of how the desired power (current) is provided to the load at a relatively constant voltage (−V). From t0 to t1 the voltage is ramping up to −V and is being provided by T2 414. From t1 to t3 the voltage is provided by the first capacitor 622 and T1 412. From t3 to t5 the voltage is provided by the second capacitor 424 and T2 414. The process continues on in this fashion.

Diagram (f) illustrates an example detailed view of how the desired power (current) is provided to the load at a relatively constant voltage (−V). At t1, the first capacitor 622 is charged to twice the desired voltage (−2V) and T1 412 is providing the compliment of the desired voltage (+V) so that the combination of the two provides approximately the desired voltage (−V). As the voltage provided by T1 412 changes, the charge in the first capacitor 622 decreases and the combination of the decreased charge from the first capacitor 422 and the charge from T1 412 provide approximately the desired voltage between t1 and t3. The combination of the second capacitor 624 and T2 414 provide approximately the desired voltage in a similar fashion between time t3 to t5. The process continues on in this fashion.

Figure 8:
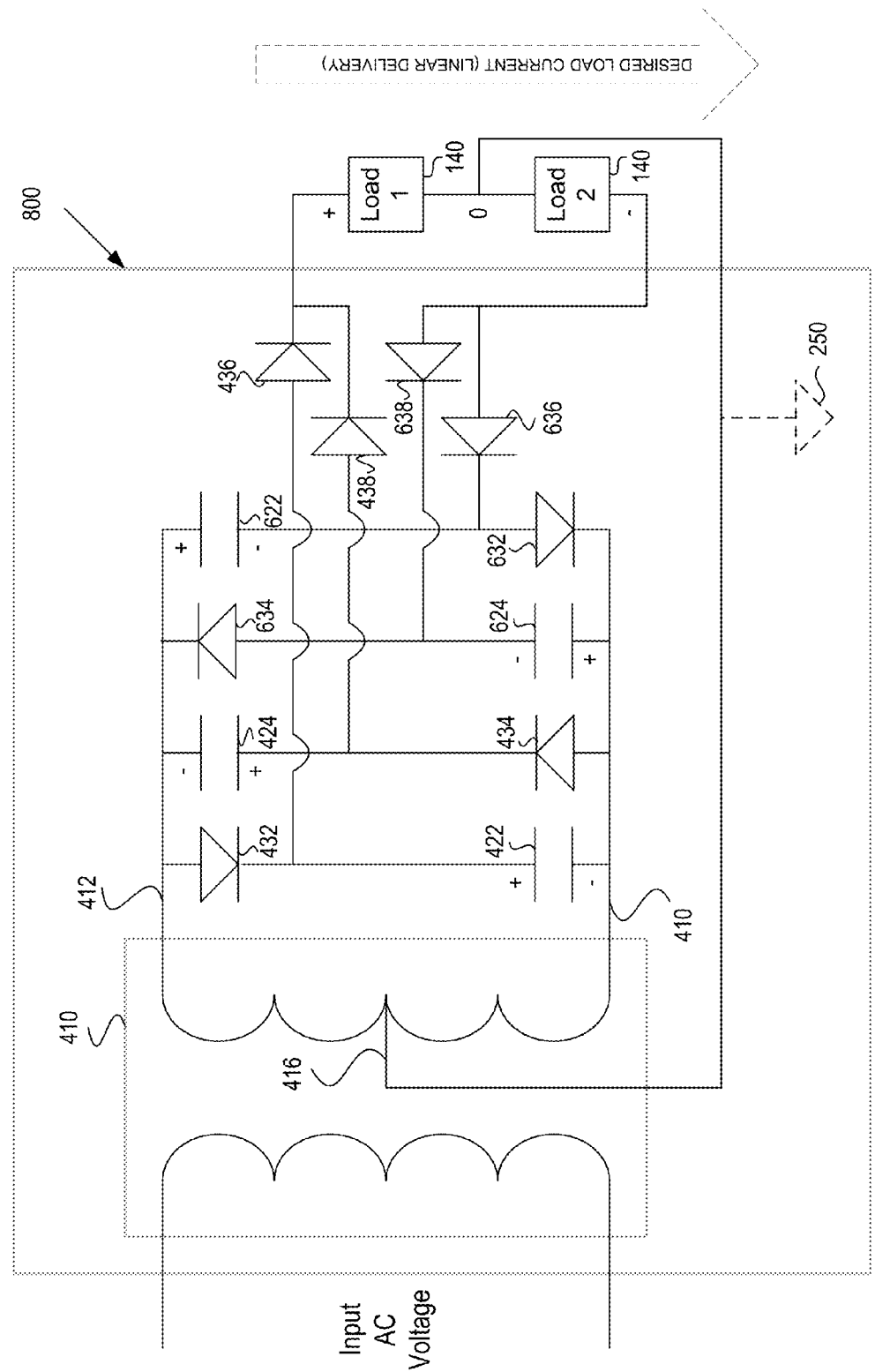
FIG. 8 illustrates an example power supply providing a positive voltage to one terminal of the load and a negative voltage to the other terminal, according to one embodiment.

FIG. 8 illustrates an example power supply 800 providing both a positive voltage and a negative voltage. The positive voltage may be provided to a first load 140 (positive terminal) and the negative voltage may be provided to a second load 140 (negative terminal) while the common terminal of each load may be tied to the CT 416 and possibly ground 250. The power supply 800 includes the capacitors 422, 424 and diodes 432, 434, 436, 438 from the power supply 400 to produce the positive voltage and the capacitors 622, 624 and diodes 632, 634, 636, 638 from the power supply 600 to produce the negative voltage.

FIG. 8 does not include the voltage regulator 460, the resistor 470 and/or the capacitor 475 for ease of illustration. According to various embodiments, the power supply 800 may include all, a subset or none of these components. According to various embodiments, the power supply 800 may utilize all or a subset of the voltage regulator 460, the resistor 470 and the capacitor 475 to provide the desired output but the components may be separate from the power supply 800.

The power supplies 400, 600, 800 removed the need for a shunt capacitor 130 to provide the constant voltage and required current for the load 140. Each of these power supplies included a center tap transformer 410 so that the taps T1, T2 412, 414 could be used to charge the capacitors to twice the desired voltage and to control the operation thereof (force charge out).

Figure 9:
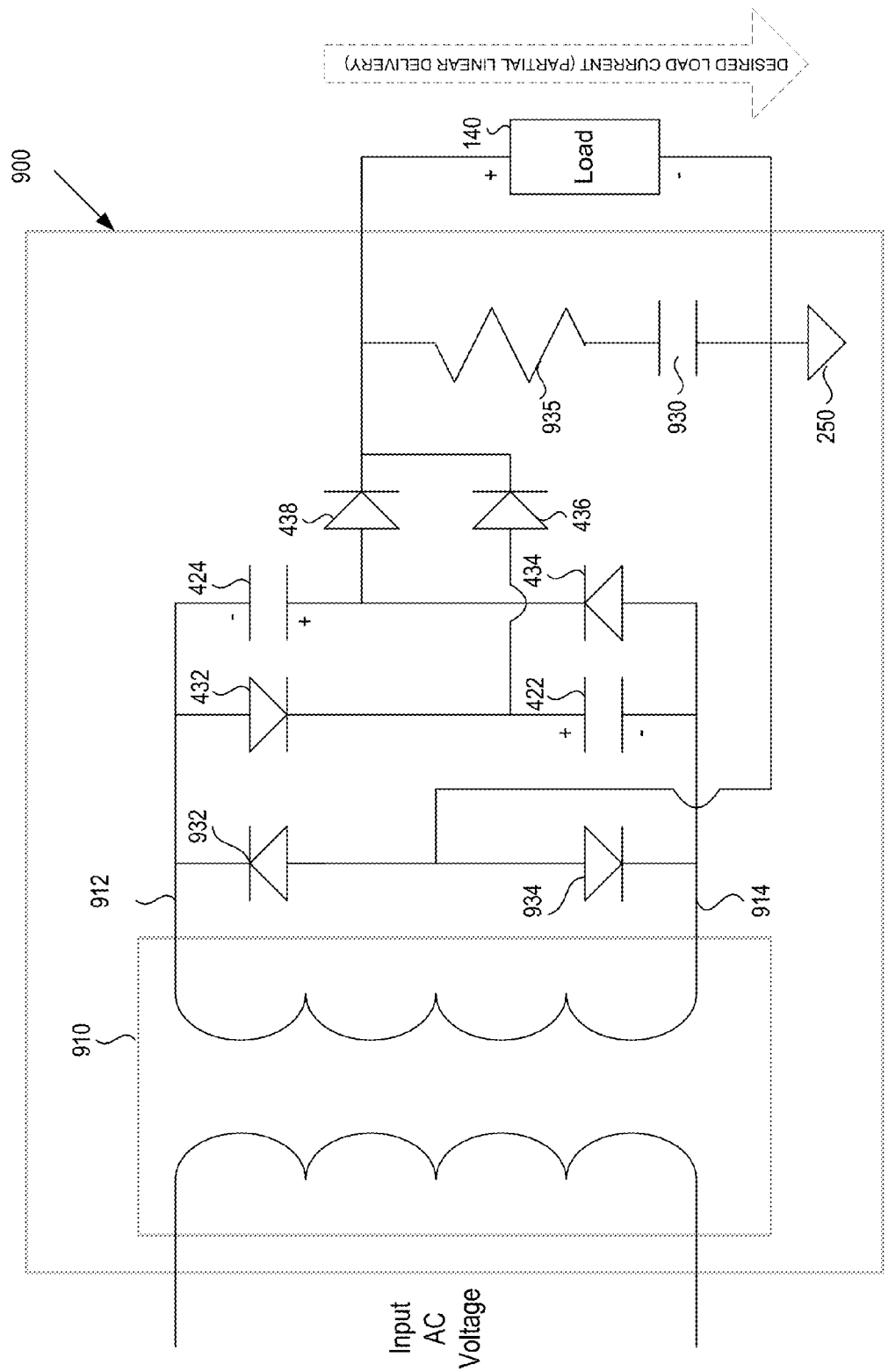
FIG. 9 illustrates an example power supply that includes a two tap transformer and a shunt capacitor, according to one embodiment.

Some power supplies will not include center tap transformers 410. FIG. 9 illustrates an example power supply 900 that includes a two tap transformer 910 (no center tap). The power supply 900 includes the capacitors 422, 424, and the diodes 432, 434, 436, 438 of the power supply 400 (version providing a positive desired voltage). In addition, the power supply 900 includes fifth and sixth diodes 932, 934 coupled between upper (T1) and lower (T2) taps 912, 914 and a common point providing a reference voltage (e.g., ground) 250. The cathodes of the diodes 932, 934 are connected to T1, T2 912, 914 and the anodes are connected to ground 250. The diodes 932, 934 will pull the voltage up to ground 250 when the respective tap T1, T2 912, 914 is providing a negative voltage.

Accordingly, each of the capacitors 422, 424 will have 0 V (common) applied to the negative terminal rather than a negative voltage. Therefore, the capacitors 422, 424 will only be charged to the desired voltage (not twice the desired voltage) and the respective tap T2, T1 914, 912 will not force charge from the capacitors 422, 424 as they proceed from −V to 0V (will only force charge out from 0V to +V). As such, this arrangement does not provide linear power delivery to the load 140 for the entire cycle or have sufficient charge stored in the capacitors 422, 424 to provide the desired voltage to the load 140 for the entire cycle.

To supplement the charge to the load 140, the power supply 900 also includes a shunt capacitor 930. In addition, a resistor 935 may be utilized in series with the shunt capacitor 930 to aid in the delivery of current therefrom in a more linear fashion. The shunt capacitor 930 would be charged by respective taps of the transformer 910 and provide the necessary power to the load 140 when the capacitors 422, 424 were not being forced to discharge (e.g., when voltage provided by tap connected to negative terminal proceeds from −V to 0V).

As configured, the power supply 900 may result in the shunt capacitor 930 pulling charge from the capacitors 422, 424 as it is providing the power to the load 140 and is beginning to discharge. That is, if the charge in the shunt capacitor 930 falls below the charge in a respective capacitor 422, 424 during this period, charge may be pulled from the respective capacitor 422, 424 to recharge the shunt capacitor 930. Another embodiment can be constructed in which the shunt capacitor 930 does not pull charge from the capacitors 422, 424.

Figure 1:
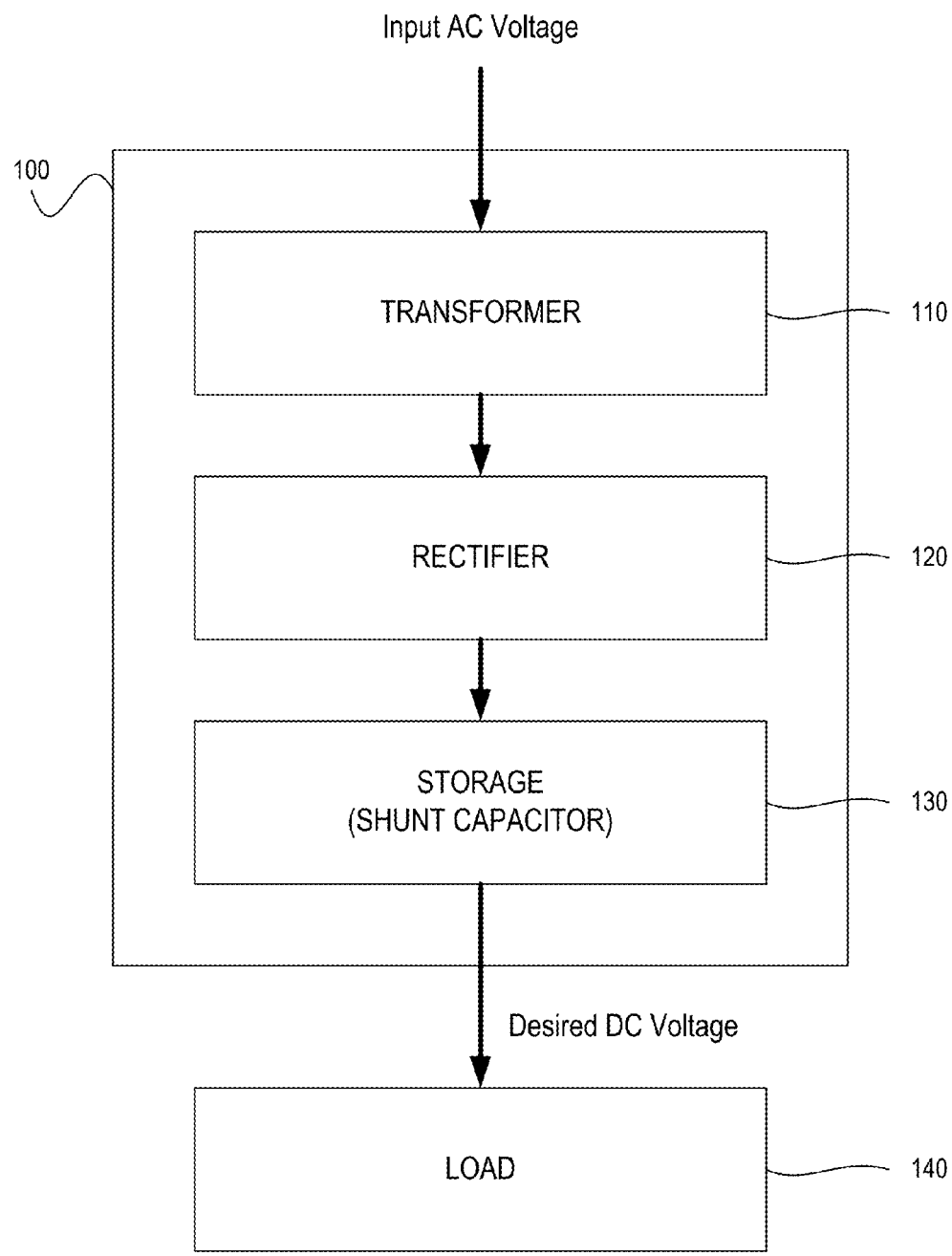
FIG. 1 illustrates a high level block diagram of an example power supply currently used to convert an alternating current (AC) voltage to a constant direct current (DC) voltage.
Figure 2A:
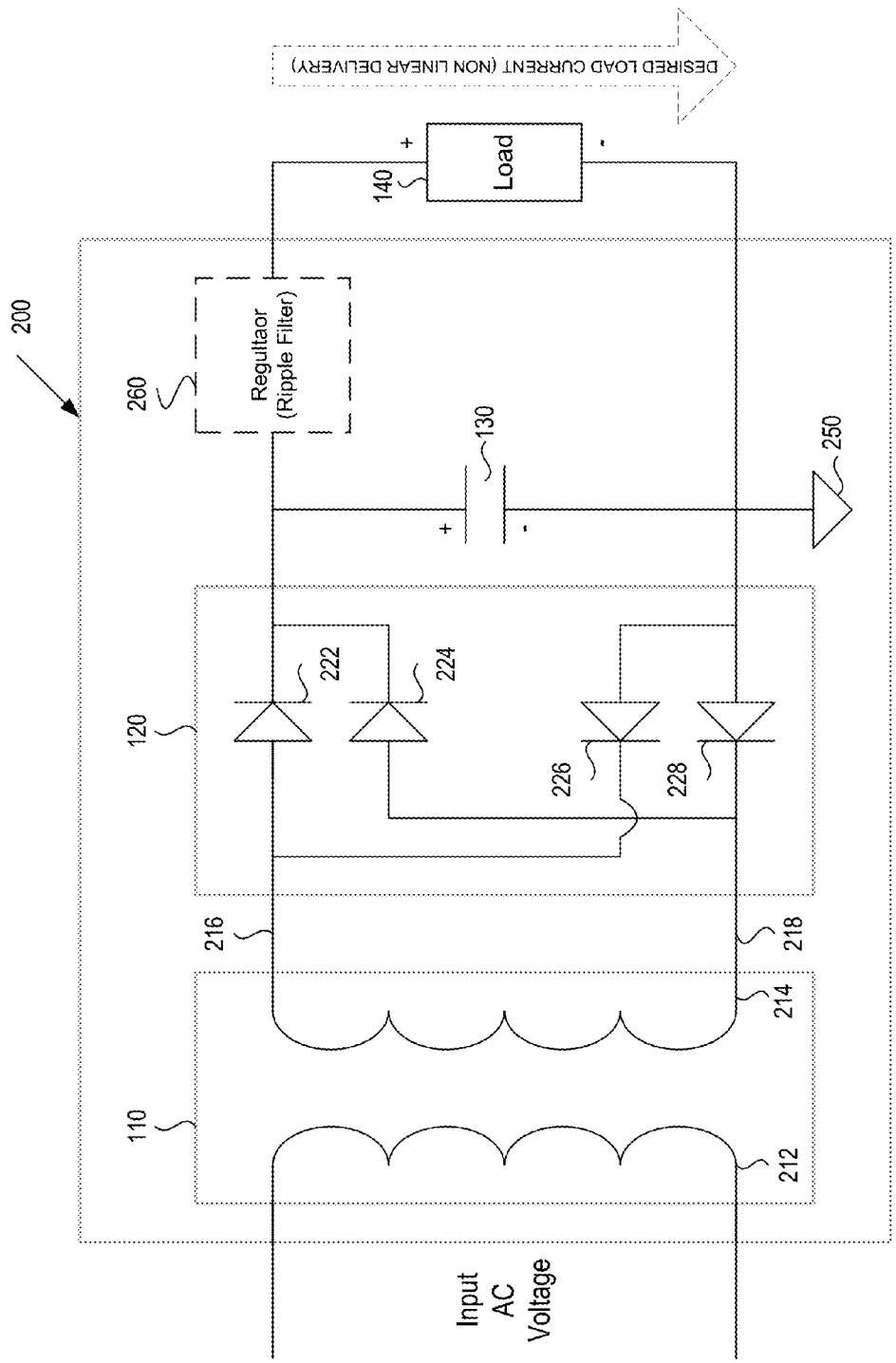
FIG. 2A illustrates a circuit diagram of one common type of power supply.
Figure 2B:
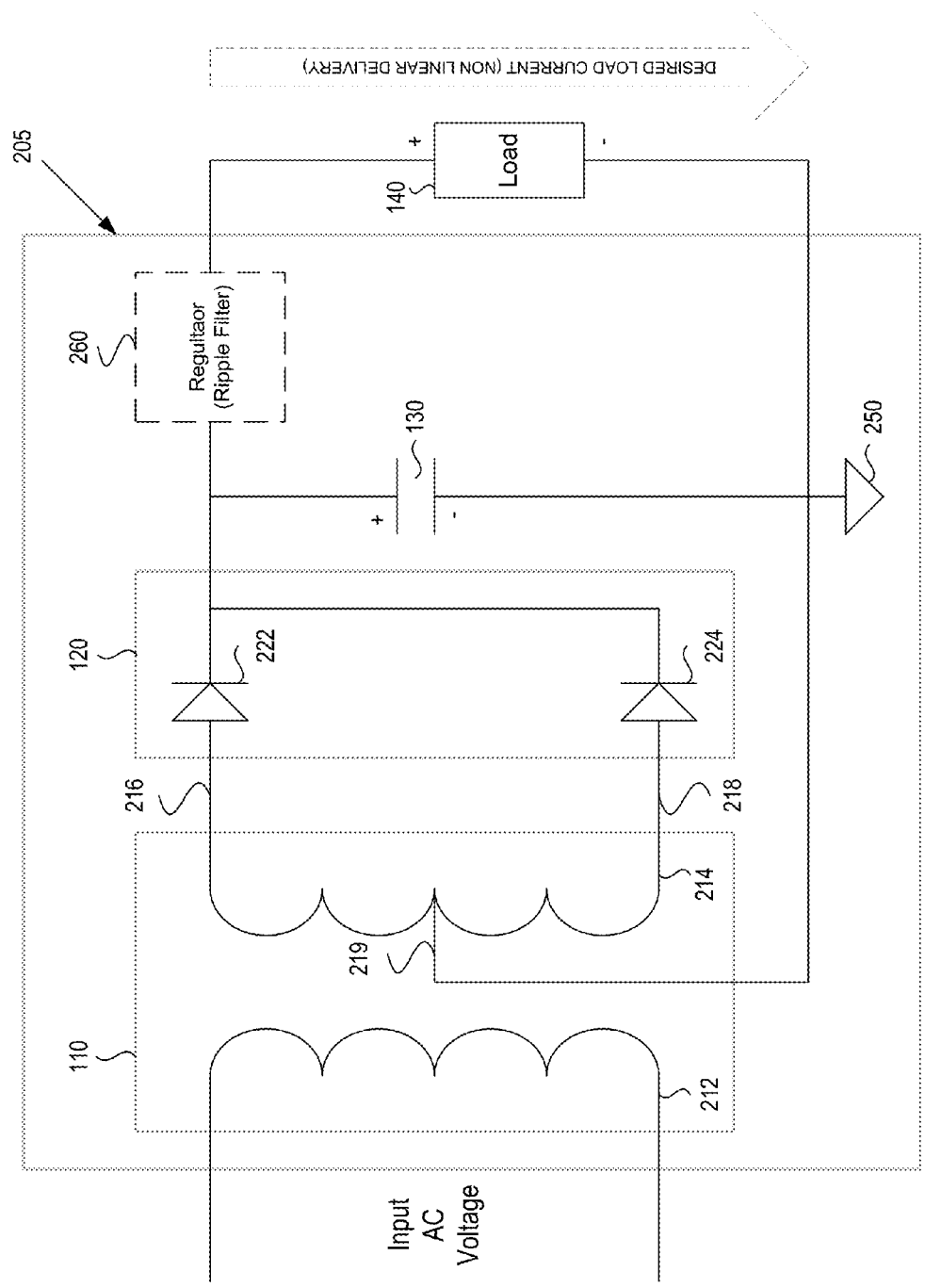
FIG. 2B illustrates a circuit diagram of one common type of power supply having a center tap transformer.
Figure 3:
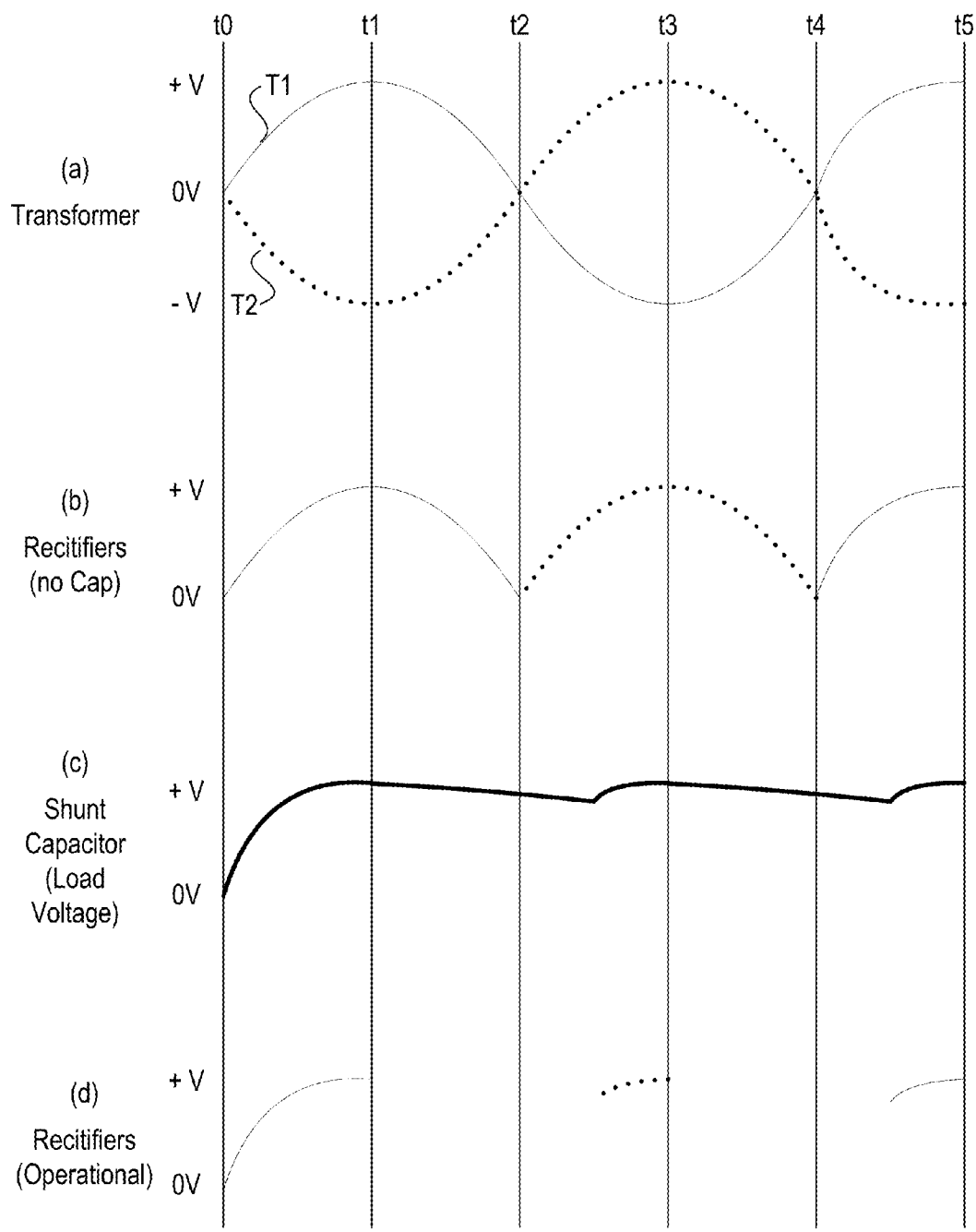
FIG. 3 illustrates an example timing diagram for the operation of a typical power supply.
Figure 10:
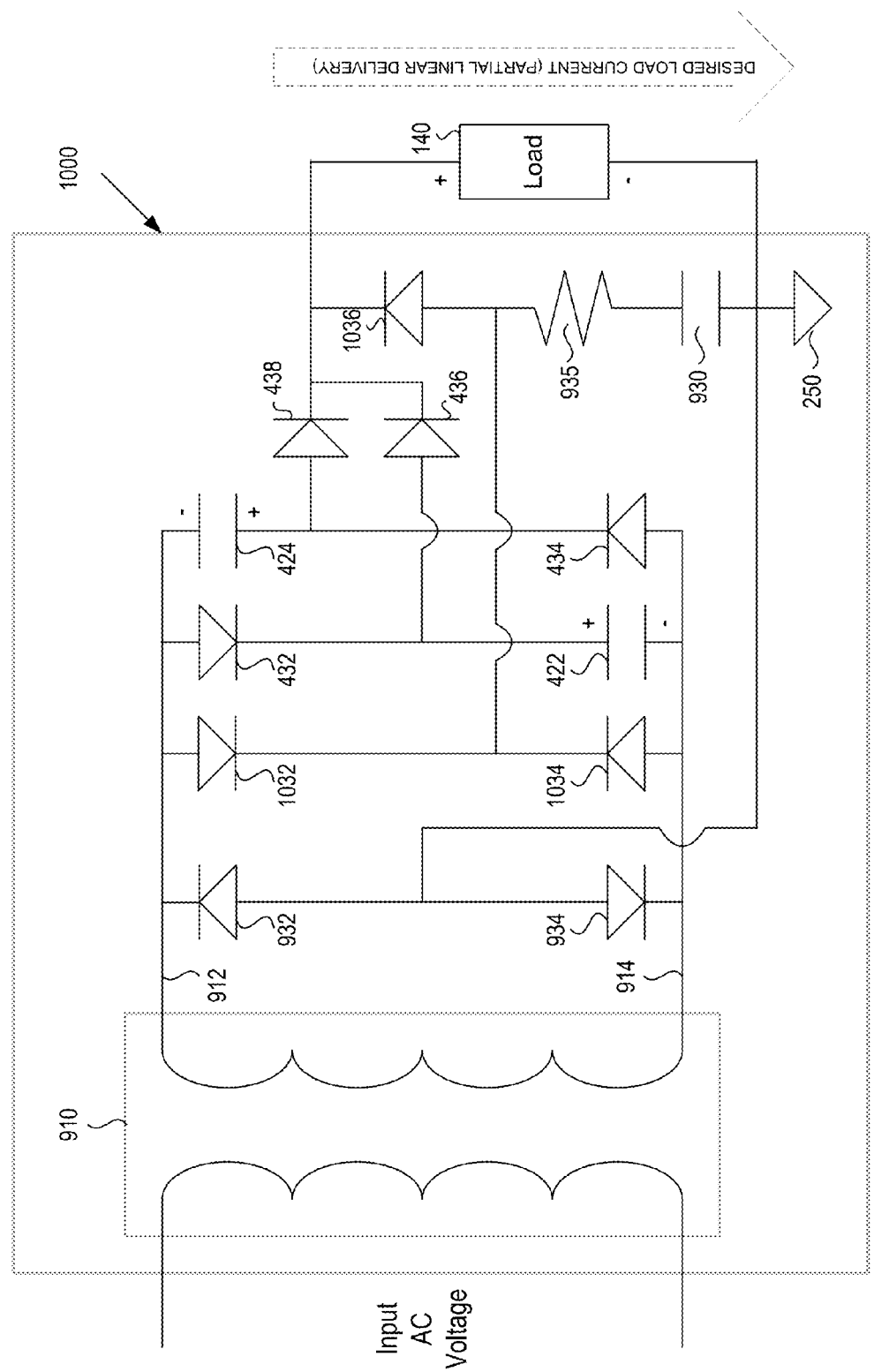
FIG. 10 illustrates an example two tap transformer power supply isolating the shunt capacitor, according to one embodiment.

FIG. 10 illustrates an example two tap transformer power supply 1000 that isolates the shunt capacitor 930 from the capacitors 422, 424. The power supply 1000 includes the same elements of the power supply 900 and also includes seventh and eight diodes 1032, 1034 coupled between T1, T2 912, 914 and the resistor 935. The anodes of the diodes 932, 934 are connected to T1, T2 912, 914 and the cathodes are connected to each other and the resistor 935. The diodes 1032, 1034 allow T1, T2 912, 914 to charge the shunt capacitor 930 via the resistor 935. In effect, the diodes 932, 934, 1032, 1034 are a full wave rectifier (e.g., 120 of FIG. 2A). The power supply 1000 also includes a ninth diode 1036 coupled between the resistor 935 and the output of the third and fourth diodes 436, 438 and the load 140. The ninth diode 1036 is to prevent the shunt capacitor 930 from pulling charge from the capacitors 422, 424 as it blocks current from flowing in that direction.

It should be noted that the power supplies 900, 1000 do not include the voltage regulator 460 for ease of illustration. The power supplies 900, 1000 may include the voltage regulator 460 or the voltage regulator 460 may be external to the power supply 900.

Figure 11A:
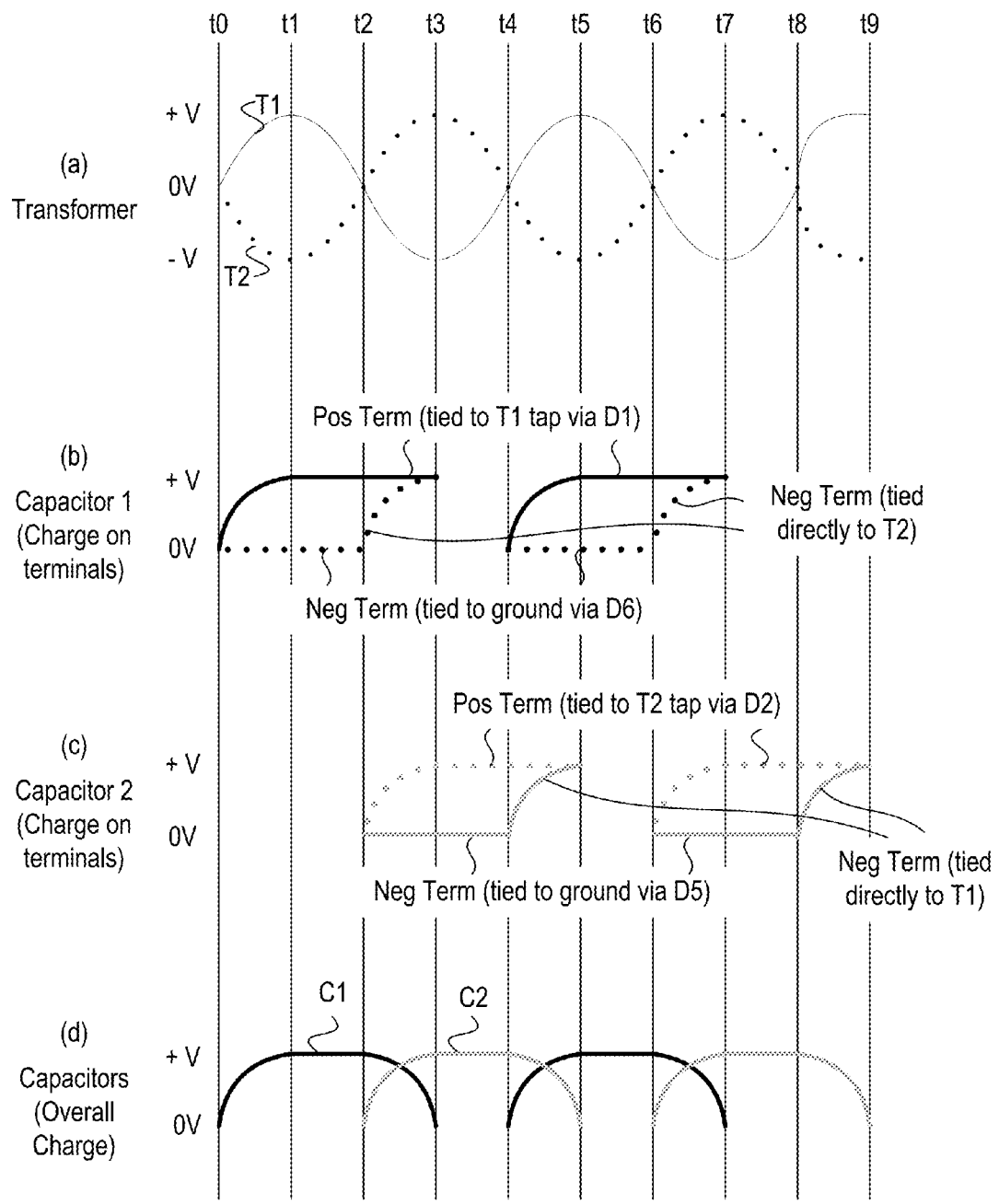
FIGS. 11A-B illustrate example timing diagrams associated with the operation of the power supply of FIG. 10, according to one embodiment.
Figure 11B:
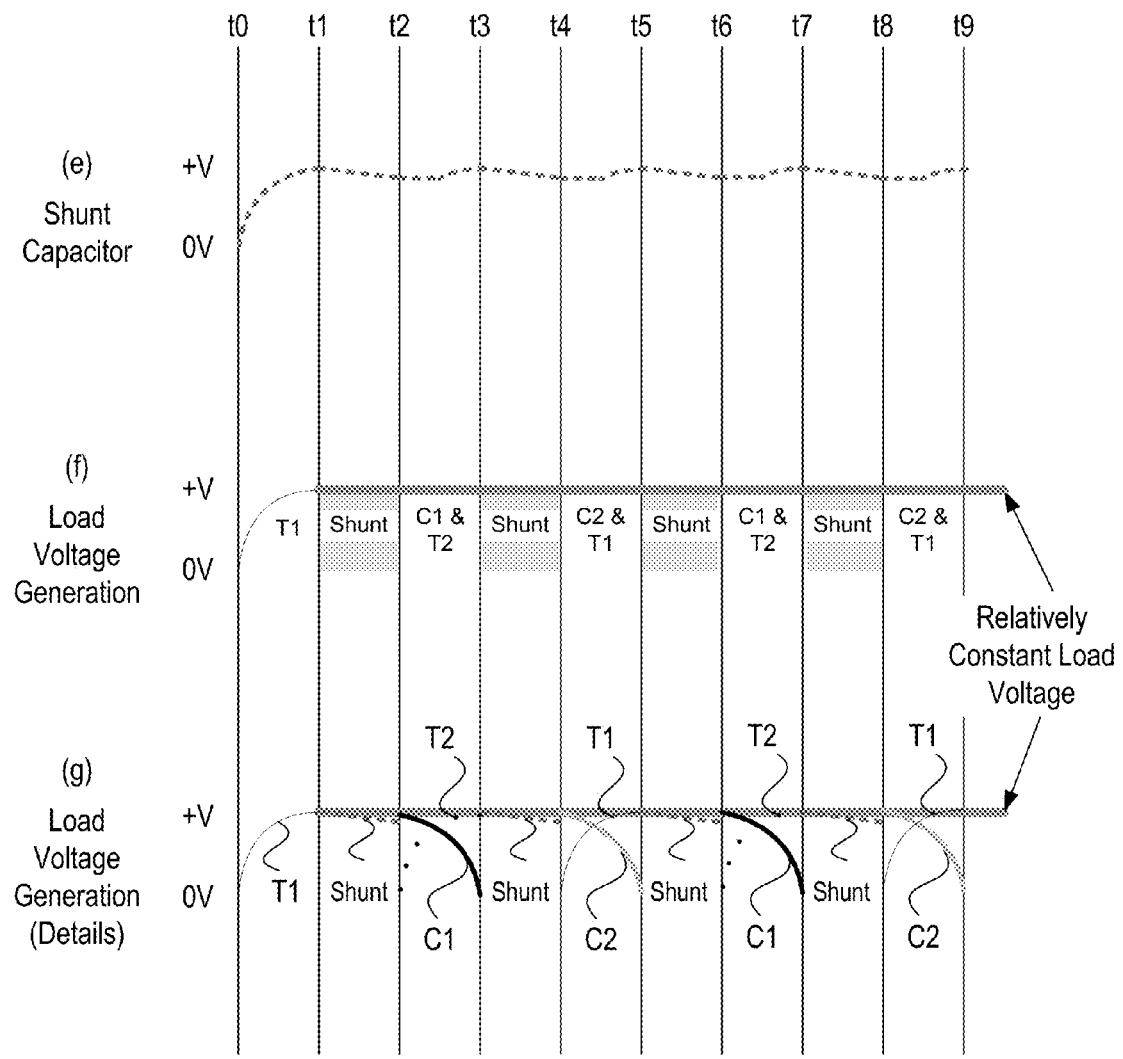

FIGS. 11A-B illustrate example timing diagrams associated with the operation of the power supply 1000. Diagram (a) illustrates an example output of the transformer 910. Diagram (b) illustrates an example charge provided on the terminals of the first capacitor 422. From time t0 to t1, the positive terminal is charged by T1 912 to +V while the negative terminal is tied to ground 250 by the sixth diode 934, since the AC voltage from T2 914 is a negative voltage at this time. At time t1, the charge stored in the first capacitor 422 is the desired voltage (difference from +V on positive terminal and 0V on negative terminal). From t1 to t3, the first diode 432 blocks the AC voltage from T1 912 as the charge on the positive terminal (+V) is greater than the voltage provided by T1 912. Accordingly, the +V charge on the positive terminal of the first capacitor 422 is maintained. From t1 to t2, the diode 934 continues to block the AC voltage from T2 914 and grounds the negative terminal. From t2 to t3, after T2 914 crosses over ground and provides a positive voltage, T2 914 increases the charge to the negative terminal of the first capacitor 422 from ground to +V as the negative terminal is directly connected to T2 914.

Diagram (c) illustrates an example charge provided on the terminals of the second capacitor 424. From time t2 to t3, the positive terminal is charged by T2 914 to +V while the negative terminal is tied to ground by the fifth diode 932 since the AC voltage from T1 912 is a negative voltage. At time t3, the charge stored in the second capacitor 424 is +V (voltage difference across positive and negative terminal). From t3 to t5, the second diode 434 blocks the AC voltage from T2 914 so the +V charge on the positive terminal of the second capacitor 424 is maintained. From t3 to t4, the diode 932 continues to block the AC voltage from T1 912. From t4 to t5, after T1 912 crosses over ground and provides a positive voltage, T1 912 increases the charge to the negative terminal of the second capacitor 424.

Diagram (d) illustrates an example overlap of the charges provided to the capacitors 422, 424. Capacitor 422 is charged to +V by T1 912 from t0 to t1, maintains its charge from t1 to t2, and is forced to discharge into the load 140 by T2 914 from t2 to t3. The process starts over again at t4. Capacitor 424 is charged to +V by T2 914 from t2 to t3, maintains its charge from t3 to t4, and is forced to discharge into the load 140 by T1 912 from t4 to t5. The process starts over again at t6. It should be noted that the charge is maintained in the first capacitor 422 from t1 to t2 and the second capacitor 422 from t3 to t4 as the shunt capacitor 930 has a higher voltage than the respective capacitor 422, 424 at those points. In the event that the charge in the shunt capacitor 930 falls below the respective capacitor 422, 424, the diode 1036 prevents the discharge of the respective capacitor 422, 424 into the shunt capacitor 930.

Diagram (e) illustrates an example charge status of the shunt capacitor 930. From time t0 to time t1, the shunt capacitor 130 is charged by T1 912. From t1 to t2, the shunt capacitor 930 provides the required power (current needed at substantially constant voltage) to the load 140. While the shunt capacitor 930 is providing power to the load 140 it slowly begins to discharge. At t2, once T2 914 begins to force the charge out of capacitor 422 into the load 140 the shunt capacitor 930 stops providing power to the load 140. Between t2 and t3, the shunt capacitor 930 is recharged by T2 914. At t3 the capacitor 422 is substantially discharged and the shunt capacitor 930 is fully charged, so from t3 to t4 the shunt capacitor 930 provides the required power to the load 140. At t4, once T1 912 begins to force the charge out of capacitor 424 into the load 140, the shunt capacitor 930 stops providing power to the load 140. Between t4 and t5, the shunt capacitor 930 is recharged by T1 912. The process continues in this fashion.

Diagram (f) illustrates an example high level view of how the desired power (current) is provided to the load 140 at a relatively constant voltage (+V). From t0 to t1 the voltage is ramping up and is being provided by T1 912. From t1 to t2 the voltage is provided by the shunt capacitor 930. From t2 to t3 the voltage is provided by the first capacitor 422 and T2 914. From t3 to t4 the voltage is provided by the shunt capacitor 930. From t4 to t5 the voltage is provided by the second capacitor 424 and T1 912. The process continues on in this fashion.

Diagram (g) illustrates an example detailed view of how the desired power (current) is provided to the load 140 at a relatively constant voltage (+V). From t1 to t2 the voltage is provided by the shunt capacitor 930. At t2, the first capacitor 422 is charged to the desired voltage (+V) and T2 914 is crossing over the reference voltage (0V). Between t2 and t3 as the voltage provided by T2 914 increases, the first capacitor 422 is discharged as charge is forced therefrom by T2 914 and the combination of the reduced charge from the first capacitor 422 and the increased charge from T2 914 provide approximately the desired voltage. From t3 to t4 the voltage is provided by the shunt capacitor 930. At t4, the second capacitor 424 is charged to the desired voltage (+V) and T1 912 is crossing over the reference voltage (0V). Between t4 and t5 as the voltage provided by T1 912 increases, the second capacitor 424 is discharged as charge is forced therefrom by T1 912 and the combination of the reduced charge from the second capacitor 422 and the increased charge from T1 912 provide approximately the desired voltage.

Although the invention has been illustrated by reference to specific embodiments, it will be apparent that the invention is not limited thereto as various changes and modifications may be made thereto without departing from the scope. Reference to "one embodiment" or "an embodiment" means that a particular feature, structure or characteristic described therein is included in at least one embodiment of the invention. Thus, the appearances of the phrase "in one embodiment" or "in an embodiment" appearing in various places throughout the specification are not necessarily all referring to the same embodiment.

The various embodiments of the invention are intended to be protected broadly within the spirit and scope of the appended claims.

What is claimed:

1. A power supply to convert Alternating Current (AC) power to Direct Current (DC) power having a relatively constant voltage, the power supply comprising:
    a center tap transformer to provide AC power, wherein a center tap of the center tap transformer is connected to a common point and a return of a load;
    a first capacitor connected directly to a first tap of the center tap transformer;
    a first diode connected between a second tap of the center tap transformer and the first capacitor;
    a second capacitor connected directly to the second tap of the center tap transformer; and
    a second diode connected between the first tap of the center tap transformer and the second capacitor,
    wherein on a cycle by cycle basis:
    the first capacitor is charged via its direct connection to the first tap and the first diode connected between the first capacitor and the second tap to twice maximum voltage from the common point,
    the second capacitor is charged via its direct connection to the second tap and the second diode connected between the second capacitor and the first tap to twice the maximum voltage from the common point,
    the first capacitor is forced to discharge into the load by its direct connection to the first tap, and
    the second capacitor is forced to discharge into the load by its direct connection to the second tap.

2. The power supply of claim 1, further comprising a third diode connected between the first capacitor and the load and a fourth diode connected between the second capacitor and the load to isolate the first capacitor and the second capacitor in order to prevent a short circuit.

3. The power supply of claim 1, further comprising a voltage regulator to convert the relatively constant voltage to a substantially constant voltage.

4. A power supply to convert Alternating Current (AC) power to Direct Current (DC) power having a relatively constant voltage, the power supply comprising:
    a transformer to provide AC power;
    a first capacitor connected directly to a first tap of the transformer;

a first diode connected between a second tap of the transformer and the first capacitor; a second capacitor connected directly to the second tap of the transformer;

a second diode connected between the first tap of the transformer and the second capacitor, a third diode to connect the first tap of the transformer to a common point and a return of a load;

a fourth diode to connect the second tap to the common point and the return of the load; and a shunt capacitor, wherein the first and the second diodes are to convert the AC power to DC power having a first voltage that varies from the common point to a maximum voltage from the common point, wherein on a cycle by cycle basis:
  the first capacitor is charged by the second tap via the first diode,
  the second capacitor is charged by the first tap via the second diode, the first capacitor is forced to discharge into the load by its direct connection to the first tap, and
  the second capacitor is forced to discharge into the load by its direct connection to the second tap, wherein discharging the first and the second capacitors provides a second voltage to supplement the first voltage for a portion of each cycle, and wherein the shunt capacitor is to be charged by the transformer via the first diode and the second diode and to provide a third voltage for a portion of each cycle when the first voltage and the second voltage are is not being provided.

5. The power supply of claim 4, further comprising a fifth diode connected between the first capacitor and the load and a sixth diode connected between the second capacitor and the load to isolate the first capacitor and the second capacitor in order to prevent a short circuit.

6. The power supply of claim 5, wherein the shunt capacitor is to be charged by the transformer via the first diode, the second diode, the fifth diode and the sixth diode.

7. The power supply of claim 4, further comprising a voltage regulator to convert the relatively constant voltage to a substantially constant voltage.

8. A power supply to convert Alternating Current (AC) power to Direct Current (DC) power having a relatively constant voltage, the power supply comprising:
  a transformer to provide AC power;
  a first capacitor connected directly to a first tap of the transformer;
  a first diode connected between a second tap of the transformer and the first capacitor;
  a second capacitor connected directly to the second tap of the transformer; and
  a second diode connected between the first tap of the transformer and the second capacitor, wherein
  the first and the second diodes are to convert the AC power to DC power having a first voltage that varies from a common point to a maximum voltage from the common point,
  the first and the second capacitors are to be continuously charged and discharged into a load by the transformer on a cycle by cycle basis, discharging the first and the second capacitors provides a second voltage to supplement the first voltage, wherein a sum of the first voltage and the second voltage equals a third voltage that is relatively constant at the maximum voltage, and
  the third voltage fluctuates from the maximum voltage based on the second voltage provided by the first and the second capacitors, wherein the second voltage varies based on slope of the first voltage.

9. The power supply of claim 8, wherein the third voltage is a positive voltage with respect to the common point.

10. The power supply of claim 8, wherein the third voltage is a negative voltage with respect to the common point.

11. The power supply of claim 8, wherein the DC power has a relatively constant negative voltage and a relatively constant positive voltage with respect to the common point.

12. The power supply of claim 8, further comprising a third diode connected between the first capacitor and the load and a fourth diode connected between the second capacitor and the load to isolate the first capacitor and the second capacitor in order to prevent a short circuit.

13. The power supply of claim 8, further comprising a voltage regulator to convert the third voltage to a fourth voltage that is substantially constant.

* * * * *